United States Patent Office 2,818,282
Patented Dec. 31, 1957

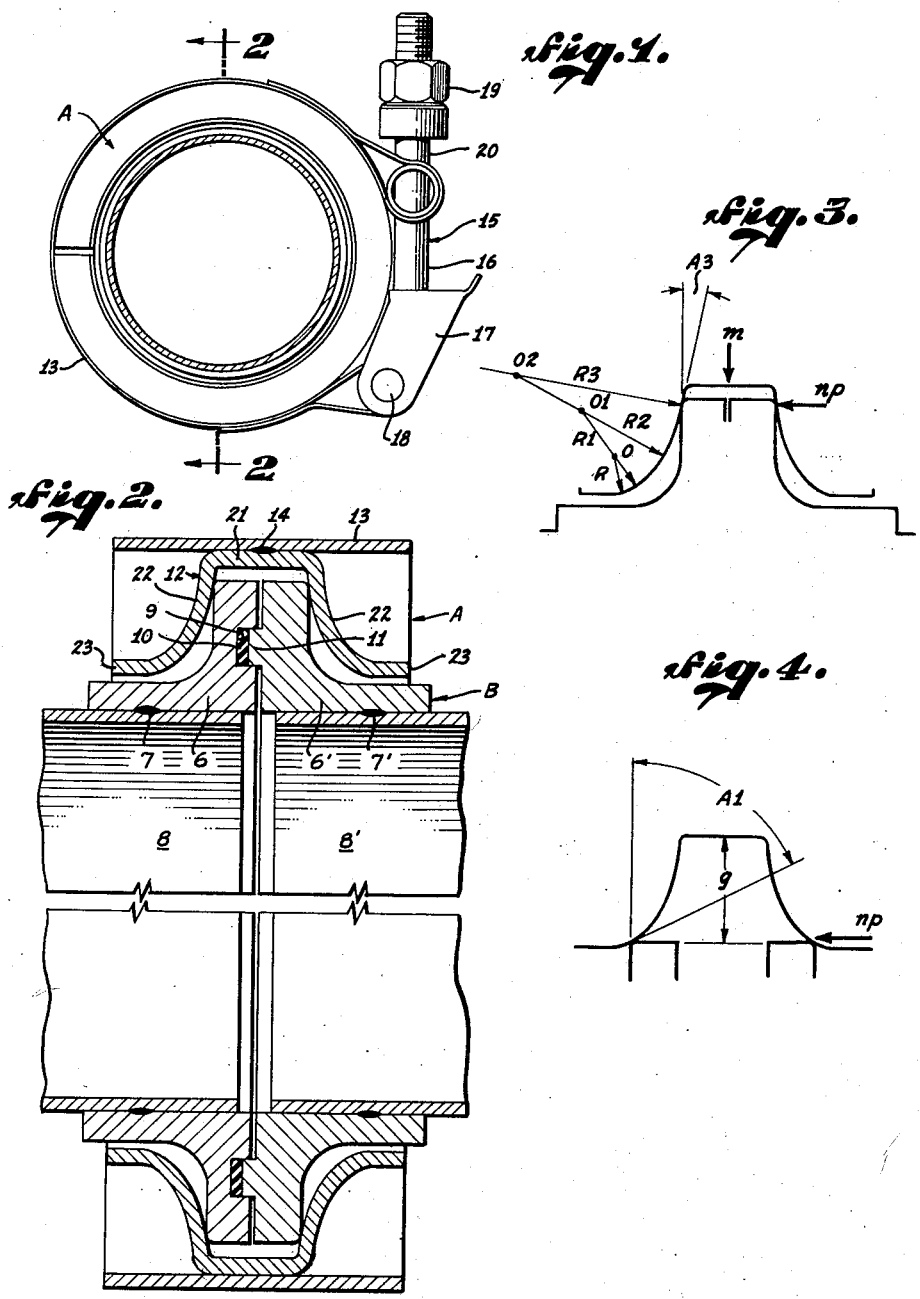

2,818,282
CAM V-RETAINER FOR V-BAND COUPLING

Albert Dale Herman, Encino, Calif., assignor, by mesne assignments, to Aeroquip Corporation, Jackson, Mich., a corporation of Michigan Application March 14, 1955, Serial No. 494,127

1 Claim. (Cl. 285—410)

This invention relates to tube couplings of the flange and contractible V-section coupling collar type. Its general object is to provide a coupling collar of improved operational characteristics.

Specifically, the invention aims to provide a coupling collar having maximum efficiency both with respect to its range of axial displacement of the tube flanges in initially drawing them together, and its capacity for high ratio resolution of applied radial contraction force into resultant pressure of the flanges against one another or against an interposed gasket or seal ring.

Other objects will become apparent in the ensuing specifications and appended drawing in which:

Fig. 1 is an axial face view of a tube coupling embodying my invention, in a fluid line assembly wherein a tube section is shown in cross section;

Fig. 2 is an axial sectional view of the same, taken on line 2—2 of Fig. 1;

Fig. 3 is a schematic diagram illustrating the development of the novel cross-sectional contour of a collar segment, and showing the relationship between the coupling collar section and tube flanges for a final stage of contraction of the collar; and Fig. 4 is a schematic diagram illustrating an early stage of contraction of the collar.

Referring now to the drawings in detail, I have shown therein, as an example of one form in which the invention may be embodied, a fluid line coupling embodying a coupling collar assembly A in embracing relation to a tube flange assembly B including mating flanges 6 and 6' of a solid type, secured, as by seam welding at 7, 7', to tube sections 8, 8' of a fluid line; the flange 7 being shown as having an annular face groove 9 to receive a packing ring 10 (e. g., an O-ring) and the flange 6' having a mating face bead 11 which enters groove 9 and compressively engages seal ring 10 therein to establish a seal. This particular flange and seal ring construction is conventional and is not an essential feature of the invention. Other types of flange and interposed seal ring combinations, e. g., rolled flanges and T-section seal ring, may as well be utilized.

The coupling collar assembly A comprises a plurality of segments 12, a constrictor band 13 to which segments 12 are attached as by spot welding at 14, and a take-up connector assembly 15 which may be of any conventional type, the disclosed example being one utilizing a T-bolt 16 having at one end a head which is engageable in a quick-coupler latch 17 pivotally attached, at 18, to a loop at one end of band 13, a nut 19, threaded on the other end of the T-bolt, bearing against a T-trunnion 20 through which T-bolt 16 extends, the trunnion 20 being pivotally mounted in a loop on the other end of band 13.

Each segment 12 includes a peripheral crown web 21, a pair of radially inwardly diverging side wall members 22, and reinforcing flanges 23 at the inner margins thereof. Side wall members 22 function to exert a wedging action against flanges 6, 6' to draw them toward one another and to place them under pressure for sealing the joint in the fluid line.

The invention is characterized by the novel cross-sectional shape of side wall members 22, such that when nut 19 is tightened to draw the ends of band 12 together and move segments 12 inwardly, closing gap $g$ (Fig. 4) between crown web 21 and the peripheries of flanges 6, 6', the axial load $np$ (pounds per inch of circumference at the pitch line where the flanges are engaged by wall members 22) will increase at an accelerated rate as compared to a constant rate of increase in the applied radial force $m$ (pounds per circumferential inch).

This is accomplished by utilizing, in wall members 22, a configuration wherein radius of cross-sectional curvature thereof gradually increases from a starting point (of minimum curvature), adjoining a reinforcing flange 23, to a point of maximum curvature near the junction with crown web 21. This is illustrated at the left side of Fig. 3, where R indicates a minimum radius struck from center O, R1 and R2 indicate selected intermediate radii of respectively increasing value, struck from centers O1 and O2, and wherein R3 indicates the maximum radius.

Conversely, the angle A subtended between a tangent to the internal camming face of a side wall member 22 at the point of application of load $np$ and a radial plane normal to the coupling axis, gradually decreases from the point of minimum radius or sharpest curvature to the point of maximum radius. The value of angle A at an intermediate point is indicated at A1 in Fig. 3, and the minimum value of angle A, at the point of maximum radius, is indicated at A3.

The relationship between the applied force $m$, the resultant axial load $n$, and angle A, is expressed in the following equation:

$$n = \left(\frac{m}{2}\right) \cot\left(\frac{A}{2}\right)$$

i. e., the resultant axial load is equal to one half the applied load multiplied by the cotangent of one half the angle A. Thus, as radial force $m$ increases linearly, the axial load $np$ at the pitch line will increase at an accelerated rate with respect to $m$.

I claim:

A fluid line coupling comprising two aligned tube sections arranged in end toward end relationship, each tube section having a radially outwardly extending annular flange integral at the end thereof whereby said flanges are disposed in forward face toward forward face relationship, each flange having a rearward surface and an annular peripheral end surface which intersects said forward and rearward faces respectively with the end surface and the rearward surface being disposed with respect to each other such that they define a substantially abrupt angle between them to provide an annular contact line along the intersection of said end and reaward surfaces on each flange, a V-band constrictor circumscribing said flanges and means on said constrictor for tightening it radially inwardly around the flanges, said constrictor comprising a peripheral crown portion spaced outwardly from said end surfaces of the flanges and a pair of spaced apart legs extending radially inwardly from the crown portion and diverging away from each other, each leg having an inside surface curved along a progressively decreasing radius of curvature inwardly from the crown portion and throughout the entire radial extent thereof, said inside surfaces of the legs being in pressure engagement with said flanges along said contact lines only on the flanges independently of the extent to which the constrictor is tightened around the flanges.

References Cited in the file of this patent
UNITED STATES PATENTS

| | | |
|---|---|---|
| 111,776 | Potter | Feb. 14, 1871 |
| 1,376,216 | Mittinger | Apr. 26, 1921 |
| 2,602,678 | Mahoff | July 8, 1952 |
| 2,729,237 | Hite | Jan. 3, 1956 |
| 2,773,709 | Smith | Dec. 11, 1956 |